(12) United States Patent
Karlsson

(10) Patent No.: US 10,956,099 B2
(45) Date of Patent: Mar. 23, 2021

(54) SYSTEM AND A METHOD FOR OPTIMIZING A PRINT PRODUCTION PROCESS

(71) Applicant: arifiQ Development AB, Östersund (SE)

(72) Inventor: Stefan Karlsson, Sollefteå (SE)

(73) Assignee: ARIFIQ DEVELOPMENT AB, Östersund (SE)

( * ) Notice: Subject to any disclaimer, the term of this patent is extended or adjusted under 35 U.S.C. 154(b) by 95 days.

(21) Appl. No.: 16/083,018

(22) PCT Filed: Mar. 9, 2017

(86) PCT No.: PCT/EP2017/055585
§ 371 (c)(1),
(2) Date: Sep. 7, 2018

(87) PCT Pub. No.: WO2017/153537
PCT Pub. Date: Sep. 14, 2017

(65) Prior Publication Data
US 2020/0167102 A1 May 28, 2020

(30) Foreign Application Priority Data
Mar. 9, 2016 (EP) .................................... 16159356

(51) Int. Cl.
*G06F 3/12* (2006.01)
(52) U.S. Cl.
CPC .......... *G06F 3/1219* (2013.01); *G06F 3/1204* (2013.01); *G06F 3/1243* (2013.01)
(58) Field of Classification Search
None
See application file for complete search history.

(56) References Cited

U.S. PATENT DOCUMENTS

| | | | | |
|---|---|---|---|---|
| 2008/0084574 A1* | 4/2008 | McDonald | ............. | G06Q 10/06 358/1.15 |
| 2009/0199734 A1* | 8/2009 | Vered | ..................... | G06Q 10/06 101/483 |
| 2011/0231864 A1* | 9/2011 | Raj B.K | .................. | G06F 9/541 719/321 |

FOREIGN PATENT DOCUMENTS

EP     1387289 A1     2/2004

OTHER PUBLICATIONS

International Search Report and Written Opinion of PCT/EP2017/055585 dated May 23, 2017, 10 pages.

* cited by examiner

*Primary Examiner* — Frantz Bataille
(74) *Attorney, Agent, or Firm* — Brundidge & Stanger, P.C.

(57) ABSTRACT

A computer-implemented method of automatically optimizing a print production process, comprising the operations of:
receiving a printed matter specification, comprising data regarding at least one printed matter, as input data from a remote device; and
determining an optimized print production specification on basis of the printed matter specification and print production resources data; wherein the operation of determining an optimized print production specification comprises:
fetching print production resources data, comprising printing press data regarding at least one available printing press;
determining all possible signatures by means of the printed matter specification;
determining, for each printing press, all possible print sheet sizes and print areas, by means of the printing press data;

(Continued)

determining all possible impositions by means of at least the signatures and the print areas; and determining an optimized production specification by means of at least the impositions, the print areas, and at least one optimization variable selected from a group of optimization variables comprising a cost variable, a delivery time, and an environmental variable.

19 Claims, 8 Drawing Sheets

SYSTEM AND A METHOD FOR OPTIMIZING A PRINT PRODUCTION PROCESS

CROSS-REFERENCE TO RELATED APPLICATION

This Application is the National Stage filing under 35 U.S.C. § 371 of PCT Application Ser. No. PCT/EP2017/055585 filed on Mar. 9, 2017, which claims the benefit of European Patent Application No. 16159356.1 filed on Mar. 9, 2016. The disclosures of both applications are hereby incorporated herein by reference in their entireties.

FIELD OF THE INVENTION

The present invention relates to a computer-implemented method of automatically optimizing a print production process.

BACKGROUND OF THE INVENTION

Estimating of the most cost efficient way to produce printed matters today means time-consuming manual work. The impact of this is that printers need to spend a lot of time on the price calculation and also that their clients have to wait to get the price. There are some major reasons for that. The specifications of a printed matter can vary almost infinitely, and every conceivable print product can be produced in many different ways. Additionally, every printing provider, such as a print shop or a printing plant, has a unique combination of equipment, labor and suppliers.

Today there are two different approaches to this task, in order to reduce the burden, i.e. standardization and cost estimating systems. Standardization means that printers calculate the prices of some standard products, allowing customers to choose between only them. This is what today's e-commerce of printed matter is based upon. Even large web shops can only offer a very small fraction of all feasible printed matters.

Cost estimating systems are typically used by all but the smallest printing plants, and they are in most cases managed by particularly experienced employees at the printing provider, as the systems require deep knowledge of the production process to make the right choices.

There are two types of input data to estimate the production cost of a printed matter; the specification of the wanted printed matter, also called product intent, and the specification of the production process of the printing provider.

As regards the specification of the wanted printed matter the following parameters are needed;
  Type of printed matter (sheet, folder, bound product, envelope etc.)
  Number of pages (body and cover)
  Finished size of the printed matter
  Paper stock type or brand, texture/color, weight (caliper) (body and cover)
  The number and type of printing colors (body and cover)
  Quantity
  Finishing and other options As regards the specification of the production process the following parameters are needed;
  Available printing presses and other machinery, their specifications and pricing
  Available paper stock items and pricing The selection of the best production alternative is done as follows. Before performing the cost estimation, the printed matter may need to be split into suitable parts, called signatures. The main types are 2, 4, 8, 12, 16, 24 and 32 pages per signature. For folded products more types are available. As an example, a 44-pager printed matter can be produced by combining 32+12 pages, 24+16+4 pages, 16+16+12 pages, 16+16+8+4 pages, etc. The division that is finally selected depends on the requested finished size of the printed matter, the sizes of available paper stock, specifications of the machinery and pricing.

Every signature can be produced in many ways. Here you have to choose printing press, raw paper stock size and print sheet size. Then you need to choose suitable layout of the pages on the print sheet, a process called imposition, taking into account the margins that are needed in the finishing. To save plates and make-ready times in sheet offset production, you can choose to lay out front and back pages on the same print sheet mirrored in the centerline so that the print sheet can be turned, which is called work-and-turn, or tumbled, called work-and-tumble, after the first print work and then be printed again on the back using the same plates.

It should be noted that it is sometime a good idea to print several ups, i.e. lay out the same signature many times on the same print sheet. Different signatures can also sometimes be fit on the same print sheet. Additionally, the imposition must often consider the grain direction of the paper stock, e.g. so that the last fold is parallel to the grain direction.

Often not all signatures can be fit on a single print sheet. All print sheets can be different to each other, i.e. different combinations of printing press, print sheet size and imposition.

After all these choices have been made, often by experienced staff at the printing provider, who know the print sheets, and for each of them the printing press, the print sheet size and the imposition.

Next step is to calculate the cost. Here even more variables are introduced, such as how many impressions will be needed for each print sheet, and how much setup waste and run waste must be taken into account. What operations will be needed and how long production time will be needed in the different operations are also necessary to estimate, as well as the material usage and costs of paper stock, printing plates, boxes etc.

To help with these calculations print estimating systems are often used, besides spreadsheets and manual calculations.

The equation to calculate the production cost is:

$$\text{Production cost} = \sum (\text{Time per operation} * \text{Hourly rate for the operation}) +$$
$$\sum (\text{Material usage} * \text{Unit cost for each item}) +$$
$$\sum \text{External costs and other}$$

A further aspect is that there are reasons for estimating the production costs for more than one printed matter at the same time. One reason is that a customer may want a single quote for many printed matters to be produced at the same time, and another reason is that the printing company may want to explore the possibilities for co-production of printed matters to lower its own production costs.

To sum the individual production costs for all printed matters is easy, but this is not always the most efficient solution if the paper specification is the same. By laying out signatures from many printed matters on the same print sheet many setup costs and material usage can be saved.

However, this is far from an easy task, because both size and quantity can vary, and moreover it should be possible to effectively cut the print sheet into the different signatures after printing.

With many printed matters and versions, the number of possible ways to combine signatures on print sheets can be very high. Typically this is used only for standardized products like business cards and stationery, since the human capacity is too low to evaluate too many alternatives.

Unfortunately, it is likely that this lack of capacity causes a non-optimized production, which in turn causes the customer to pay a higher price than would be necessary.

SUMMARY OF THE INVENTION

It would be advantageous to provide a solution by means of which it would be possible to determine a most efficient way of producing the printed matter.

To better address this concern, in a first aspect of the invention there is presented a computer-implemented method of automatically optimizing a print production process, comprising the operations of:

receiving a printed matter specification, comprising data regarding at least one printed matter, as input data from a remote device; and determining an optimized print production specification on basis of the printed matter specification and print production resources data.

The operation of determining an optimized print production specification comprises:

fetching print production resources data, comprising printing press data regarding at least one available printing press;

determining all possible signatures by means of the printed matter specification;

determining, for each printing press, all possible print sheet sizes and print areas, by means of the printing press data;

determining all possible impositions by means of at least the signatures and the print areas;

determining an optimized production specification by means of at least the impositions, the print areas, and at least one optimization variable selected from a group of optimization variables comprising a cost variable, a delivery time, and an environmental variable. According to this method far more alternatives of impositions etc. are created than in the prior art, and due to the advantageous optimization it is, additionally, possible to compare far more alternatives than a person is capable of doing.

In accordance with an embodiment of the method the determination of an optimized production specification comprises storing each combination of signatures, printing press, print area and imposition as a print sheet alternative, and determining, for each stored print sheet alternative, a number of printing plates, a number of impressions, and a number of sheets to be printed. Thereby all print sheet alternatives of interest are provided in contrast to the prior art methods.

In accordance with an embodiment of the method the determination of a number of sheets to be printed comprises determining a net number of sheets to be printed by dividing a required quantity of the print sheet after printing of each signature with the number of ups of the signature, finding the largest number of these results, and then determining the gross number of sheets to be printed by adding an estimate for setup and run waste. Thereby, the parameters needed for a production cost calculation are obtained.

In accordance with an embodiment of the method the determination of an optimized production specification comprises determining all production alternatives by determining all feasible combinations of print sheet alternatives to print all required signatures once, and determining said at least one optimization variable for all production alternatives. Thereby it is possible to obtain a more optimized alternative than in prior art. In accordance with an embodiment of the method the determination of an optimized production specification comprises determining a best choice among the results of the determination of said at least one optimization variable for all production alternatives; wherein the method further comprises sending at least data associated with the best choice to the remote device. A pre-defined mark-up may be added to the cost to present a price to the remote device.

In accordance with an embodiment of the method the determination of an optimized production specification comprises reducing the number of alternatives to compare by applying an exclusion criterion, which excludes unrealistic alternatives. This operation is able to significantly reduce the number of calculations that a device executing the method has to do, thereby rendering comparatively low response times for the user initiating the request. By the expression unrealistic alternatives is meant alternatives that are obviously unpractical and/or obviously costly.

In accordance with an embodiment of the method it further comprises sending a printing order including the optimized production specification to a printing provider having production resources which enable printing according to the optimized production specification. Thereby the printing provider gets an immediate order, which facilitates the work for the customer and shortens the delivery time. It should be noted that at least for the purposes of this application, the term printing provider relates to any manufacturer of printed matter, i.e. anything from small manufacturers, often called print shops, to large printing plants, and both individual companies and individual production sites within a company or a company group.

In accordance with an embodiment of the method the optimized production specification comprises at least a list of print sheets and associated data, a list of work tasks to be performed at a printing provider, and a list of all material needed to produce the printed matter according to the printed matter specification.

In accordance with an embodiment of the method the group of optimization variables further comprises costs for expendable supplies, and a contribution margin.

In accordance with an embodiment of the method the printed matter specification comprises type of printed matter, number of pages, finished size of the printed matter, paper stock type or brand, texture, color, weight, the number and type of printing colors, quantity, and finishing and other options.

According to another aspect of the present invention, there is provided a system for determining an optimized print production specification. The system has a database containing print production resources data, and an optimization unit, which is arranged to perform the operations described above.

According to another aspect of the present invention, there is provided a printing procedure, which is arranged to be activated by a user who has created a document to be printed, comprising:

detecting a choice of the printing procedure for executing a print job;

scanning the print job for metadata;

requesting print production resources data from an optimization device, which is arranged to perform the method according to claim 1;

presenting print production data, included in the print production resources data, and comprising at least a paper stock list, to the user, and prompting the user to input printed matter variables comprising at least a choice of paper and an associated quantity;

receiving the printed matter variables, generating a printed matter specification and sending the printed matter specification to the optimization device receiving at least data associated with a best choice from the optimization device and presenting it to the user; and checking for user input of an acceptance, and, when receiving an acceptance, requesting the optimization device to send a printing order including the optimized production specification and the document to be printed to a printing provider having production resources which enable printing according to the optimized production specification.

BRIEF DESCRIPTION OF THE DRAWINGS

The invention will now be described in more detail and with reference to the appended drawings in which.

DESCRIPTION OF EMBODIMENTS

Figure 1:
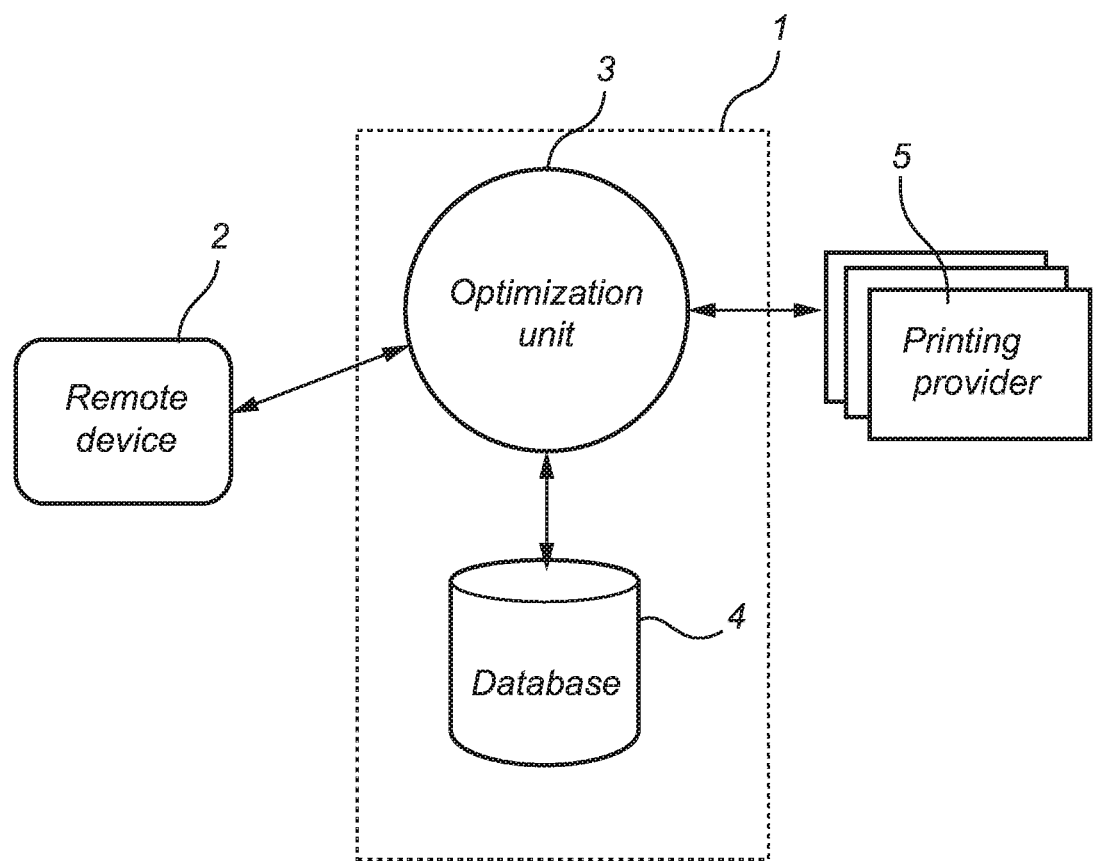
FIG. 1 is a block diagram of an embodiment of a system according to the present invention.

An embodiment of a system 1 for generating an optimized print production process according to this invention is shown in FIG. 1. The system 1 comprises an optimization unit 3, which in this embodiment is implemented as a server 3, and a database 4, which is connected with the server 3. All connections described herein can be wired, wireless or a combination thereof. The server 3 is connected with a remote device 2, which can be a user computer, or some device with which a user computer communicates for communication on the Internet, and with a printing provider 5. The server 3 is a central device on which the present method is executed, as will be described below. In other words, the server 3 is arranged to perform the operations included in the method of the present invention. Typically, the operations are performed by means of computer executable software portions downloaded at the server 3. Thus, a computer program for optimizing a print production process has been installed at the server 3. When the server is called by the remote device 2, the computer program determines the most cost efficient way to produce one or more printed matters and the total costs. The server 3 can be implemented as a general purpose computer executing computer program instructions to perform the calculations for processing the data in order to perform the optimization. Alternatively, a special purpose computer being specialized for generating the optimized print production process can be manufactured. The different operations of the method can be implemented by means of computer program portions, or by means hardware elements or a combination thereof.

As input data for the determination, the server 3 receives a printed matter specification from the remote device 2, and fetches print production resources data from the database 4. More particularly, the print production resources data comprises data about all available printing presses and other equipment, their specifications and pricing, as well as all available paper stock items and pricing. The print production resources data has been received from one or more printing providers and stored in the database 4.

The server 3 is capable of handling all types of printing equipment, i.e. printing technology such as offset, digital, digital offset, inkjet, large format etc., and media handling such as web fed and sheet fed.

Figure 2:
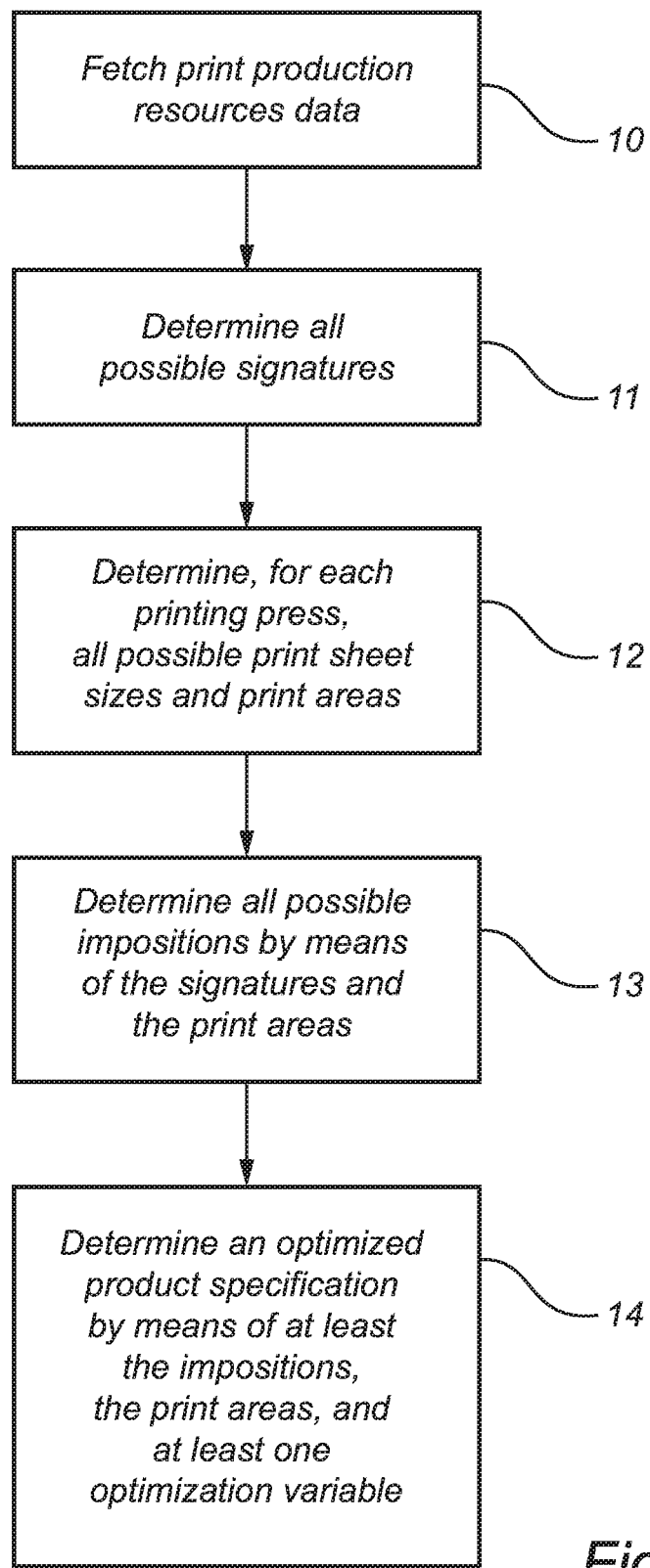
FIG. 2 is a flow chart of an embodiment of a method according to the present invention.

According to an embodiment of the computer-implemented method of automatically optimizing a print production process, as illustrated in FIG. 2, the method comprises the overall operations of receiving a printed matter specification, from the remote device 2, and determining an optimized print production specification, at the server 3, on basis of the printed matter specification and print production resources data fetched from the database 4.

The printed matter specification, which is also called a product intent, comprises data regarding at least one printed matter. This means that the request from the user can contain several different printed matters, such as brochures, books, post cards, etc. For instance, for each printed matter, the printed matter specification includes data regarding desired type of printed matter, i.e. binding type, e.g. sheet, folder, bound product, or envelope, finished size, paper stock, e.g. type of stock, brand, texture, color, and weight, typically for body and cover, the number and type of printing colors (body and cover), the number of pages (body and cover), the quantity, and finishing options and possible other options.

Still on a fairly general level, the operation of determining an optimized print production specification comprises the following operations. First all specifications of the available production equipment, i.e. the print production resources data, at the selected production site, including specifications of one or more printing presses and finishing equipment, are fetched from the database, as shown in box 10. All possible signatures for printing the printed matter or matters according to the printed matter specification are determined, as shown in box 11. When determining the possible signatures the specified binding type and the print production resources data, are considered. This determination also includes determining the size of each signature, wherein the bleed and finishing margins, if any, are taken into account.

The specifications for each printing press, here called printing press data, includes media handling, printing method, number of colors front and back, maximum and minimum paper size, maximum print area, edge margins including gripper, production speed, make-ready times, plate cost, setup time, setup and run waste, inline finishing options etc. For each printing press, all possible print sheet sizes and print areas are determined, in box 12. All possible impositions are then determined by means of the signatures and the print areas, in box 13. An optimized production specification is determined by means of at least the impositions, the print areas, and at least one optimization variable selected from a group of optimization variables comprising a cost variable, a delivery time, and an environmental variable, in box 14.

Figure 3:
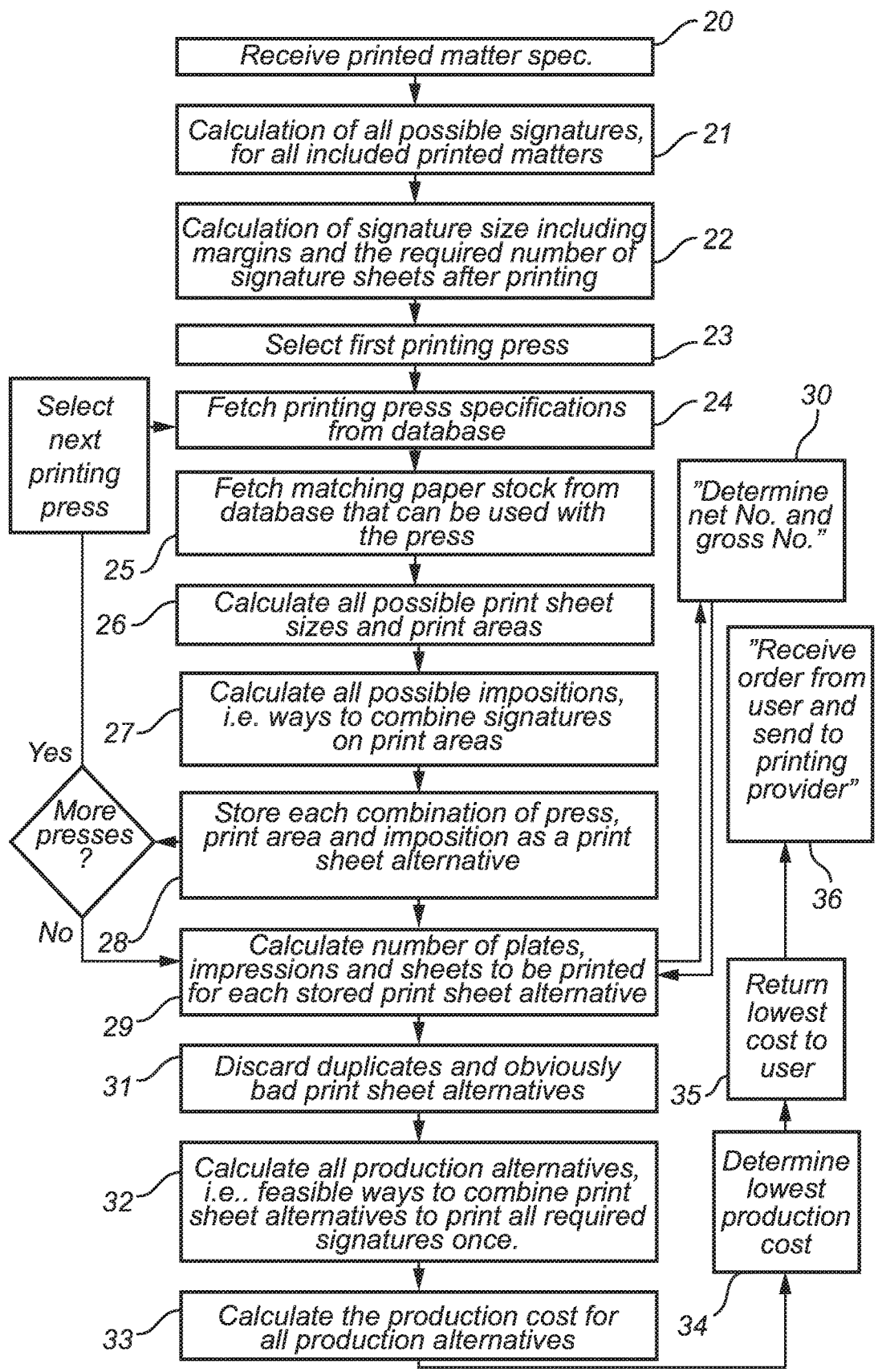
FIG. 3 is a more detailed flow chart of an embodiment of the method.
Figure 4:
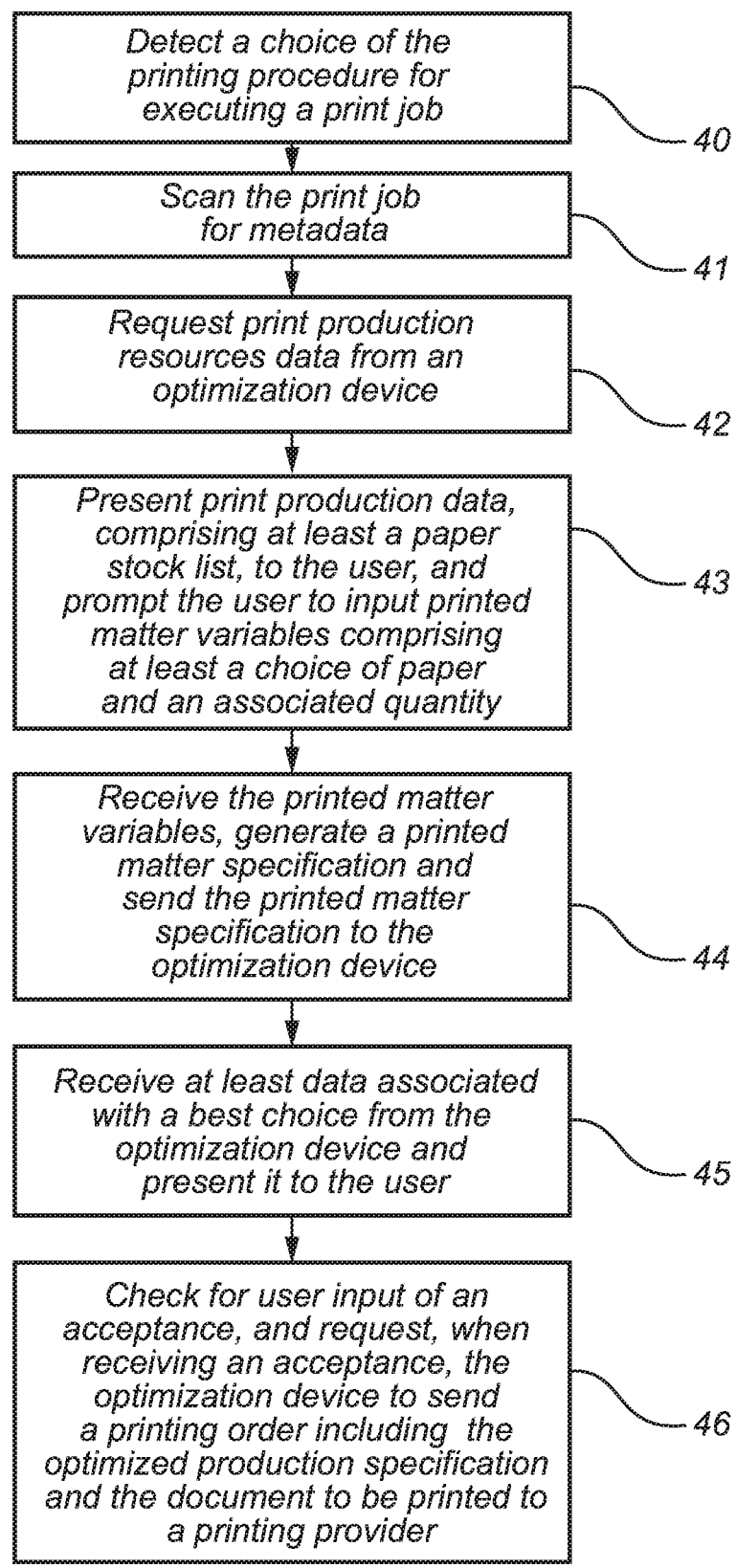
FIG. 4 is a flow chart of an embodiment of a printing procedure according to the present invention.

More particularly, on a more detailed level, as illustrated in FIG. 3, the above-mentioned operation of receiving a printed matter specification, here shown in box 20, is followed by the determination of signatures, which in turn comprises determining all possible signatures for all included printed matters, in box 21, and determining the sizes of the signatures, taking into account required margins, and determining the number of signature sheets after printing, in box 22. The number of sheets required after printing is calculated by starting backwards from the product intent quantity to be delivered of each printed matter. For each predecessor operation in the production line is added estimates for setup and run waste, based on specifications of the machinery involved. The input quantity to each operation must be the output quantity of the operation plus waste of the operation. Some finishing operations may be performed several up which must be taken into account as well. This formula is used for every operation i from the last operation until the printing operation is reached.

$$\text{Output } quant_{i-1} = \frac{\text{Output } quant_i}{\text{No. of } ups_i} * (1 + \text{Run waste } ratio_i) + \text{Setup } waste_i$$

The above operation of fetching print production resources data, from the database 4, in box 10, comprises selecting a first printing press, in box 23, fetching printing press data, e.g. specifications, about that printing press, in box 24, and fetching a matching paper stock that can be used with the first printing press, in box 25.

Next, all possible print sheet sizes and print areas for the first printing press are determined, in box 26. This operation contains slightly different calculations depending on what type of printing press it is.

If the press is sheet fed the following operations are performed. The fetched printing press data contains all available paper sheet sizes matching the printing press specifications. The original paper sheets can be cut zero, one or many times before printing, to match the minimum and maximum print sheet sizes of the printing press. For each print sheet size, the maximum available print area is calculated. The print area is usually slightly less than the print sheet size due to gripper margins and other edge margins.

If the press is web-to sheet the print sheet area is decided using the width minus edge margins and cut-off length.

If the press is web-to-web (e.g. large format) the print sheet width is decided using the width minus edge margins. There is no fixed print sheet length, but instead the paper usage is calculated based on the signatures.

Then all possible impositions are determined, in box 27, for all resulting combinations of printing presses and print areas. More particularly, the impositions are calculated by means of fitting one or many signatures one or many times, taking the grain direction of the print sheet into account if necessary. If feasible, several ups, work-and-turn, and work-and-tumble are tried.

Furthermore, the above operation of determining an optimized production specification comprises the following operations. Each combination of printing press, print area, and imposition is stored in a memory of the server 3 as a print sheet alternative, in box 28. If there are more printing presses the above operations performed for the first printing press are performed for the other printing presses as well.

Then, for each stored print sheet alternative the numbers of printing plates, impressions, and sheets to be printed are determined, in box 29.

As regards the number of sheets to be printed, as indicated in box 30, first a net number of print sheets is calculated by dividing the required quantity after printing of each signature with the number of ups of the signature and then finding the largest number of these results, according to the following equation:

$$\text{Net number of print sheets} = \max_i \frac{(\text{Required quantity after printing})_i}{(\text{Number of ups})_i}$$

where i=1 to number of signatures on the print sheet.

Then a gross number of print sheets is calculated by adding an estimate for setup and run waste, which gross number of print sheets is the resulting number of sheets to be printed. The number of impressions is calculated based on the number of sheets to be printed but also considering the number of colors front and back, both of the printing press and the signatures.

Since the number of print sheet alternatives tends to be enormous, even a fast computer of today will need an undesirably long time to perform the final operations if all alternatives would be considered. Therefore, exclusion criteria have been determined, which significantly reduces the number of print sheet alternatives, in box 31. The rejected alternatives are either duplicates or obviously unrealistic for one reason or another. For instance, if two print sheet alternatives use the same press and contain the same set of signatures, some parameters are compared; the number of plates, the number of print sheets and the number of impressions. If all the figures for one of the print sheet alternatives are higher than or equal to the figures for the other of the print sheet alternative, the first print sheet alternative can be discarded.

Exclusion criteria can optionally be applied to one or more of the preceding operations, where applicable. The criteria will, however, need to be most carefully determined in order not to exclude useful data.

Having the reduced amount of print sheet alternatives at hand, all production alternatives are determined by determining all feasible combinations of print sheet alternatives to print all required signatures once, in box 32. Then an optimization on basis of one or more optimization variables is to be performed. In this example, as well as generally throughout the description below, the total production cost is chosen as the optimization variable. By means of cost data residing in the print production resources data fetched from the database 4, the production costs for all the production alternatives are determined, in box 33. Finally, the lowest possible production cost is determined, in box 34, and is stored in the memory together with a corresponding optimized, with respect to production costs, production specification. Typically, a list of several production alternatives including production cost and production specification are stored. Thus, for this optimization variable, the best choice mentioned above is the lowest production cost. The production specification comprises all information needed for the printing provider to produce exactly the printed matter or matters asked for, but also additional information useful for the user, i.e. the customer, or for both, such as each print sheet alternative, operation times, material usage and costing.

According to this embodiment of the method, it also comprises an operation of sending the lowest production cost to the remote device 2, i.e. to the requesting user, in box 35.

Additionally, the message sent to the user can contain an inquiry about whether the user is interested in ordering the printing job. At reception of an order from the remote device 2, a printing order is sent to the printing provider who is the origin of the print production resources data, which has been used to determine the lowest cost production specification, in box 36. The production specification is included in the order, as already mentioned above, and typically comprises a list of print sheets and associated data, a list of work tasks to be performed at the printing provider, and a list of all material needed to produce the printed matter according to the printed matter specification. The list of print sheets and associated data can include, for each print sheet e.g. names/identifications of the included parts and signatures, the selected printing press, the stock paper size, the sheet paper size, the imposition, the paper stock to buy, the net and gross number of stock paper needed, the number of impressions, and a graphical picture describing the print sheet. The list of work tasks can include e.g. an operation code, time planned, hourly rates for labor and machine, cost, and predecessor tasks. The list of material can include e.g. paper stock, plates, and packaging material.

Several different applications, which employ the computer-implemented method of optimizing a production specification, are possible.

Thus, according to another aspect of the present invention there is provided a printing procedure, which is arranged to be activated by a user who has created a document to be printed, comprising:

- detecting a choice of the printing procedure for executing a print job, in box 40;
- scanning the print job for metadata, in box 41;
- requesting print production resources data from an optimization device, which is arranged to perform the above method, in box 42;
- presenting print production data, included in the print production resources data, and comprising at least a paper stock list, to the user, and prompting the user to input printed matter variables comprising at least a choice of paper and an associated quantity, in box 43;
- receiving the printed matter variables, generating a printed matter specification and sending the printed matter specification to the optimization device, in box 44;
- receiving at least data associated with a best choice, such as a lowest possible production cost, from the optimization device and presenting it to the user, in box 45; and
- checking for user input of an acceptance, and, when receiving an acceptance, requesting the optimization device to send a printing order including the optimized production specification and the document to be printed to a printing provider having production resources which enable printing according to the optimized production specification, in box 46.

This printing procedure can be implemented as a plug-in, which can be referred to as a virtual print driver, which is installed into the operating systems, such as e.g. Apple Mac OS X or Microsoft Windows 10, of computers and other appropriate devices. When the user wants to print from any desktop application, this virtual driver can be selected, and is then activated to perform the printing procedure as described above.

Figure 5:
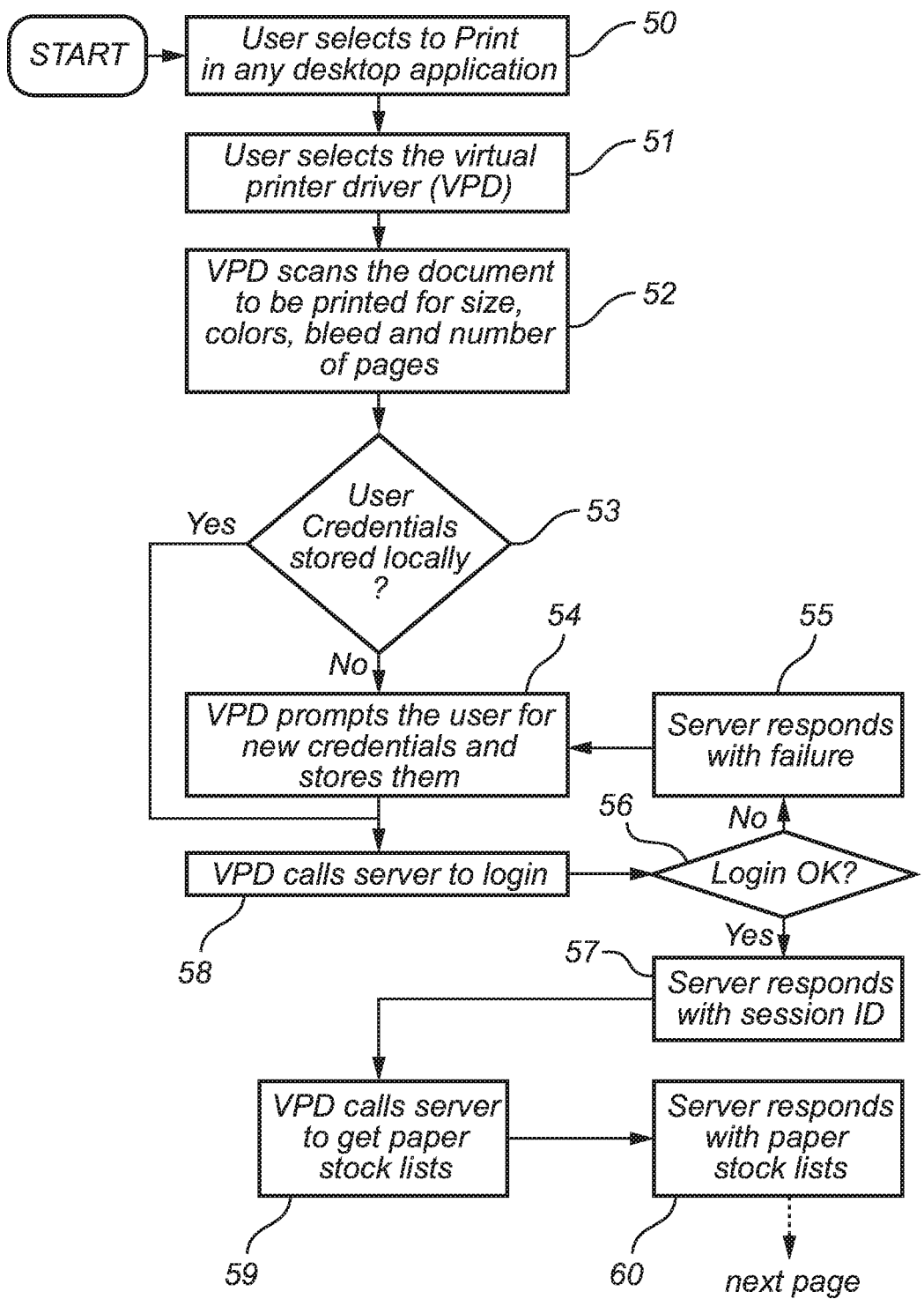
FIG. 5 is a more detailed flow chart of an embodiment of the printing procedure.
Figure 5:
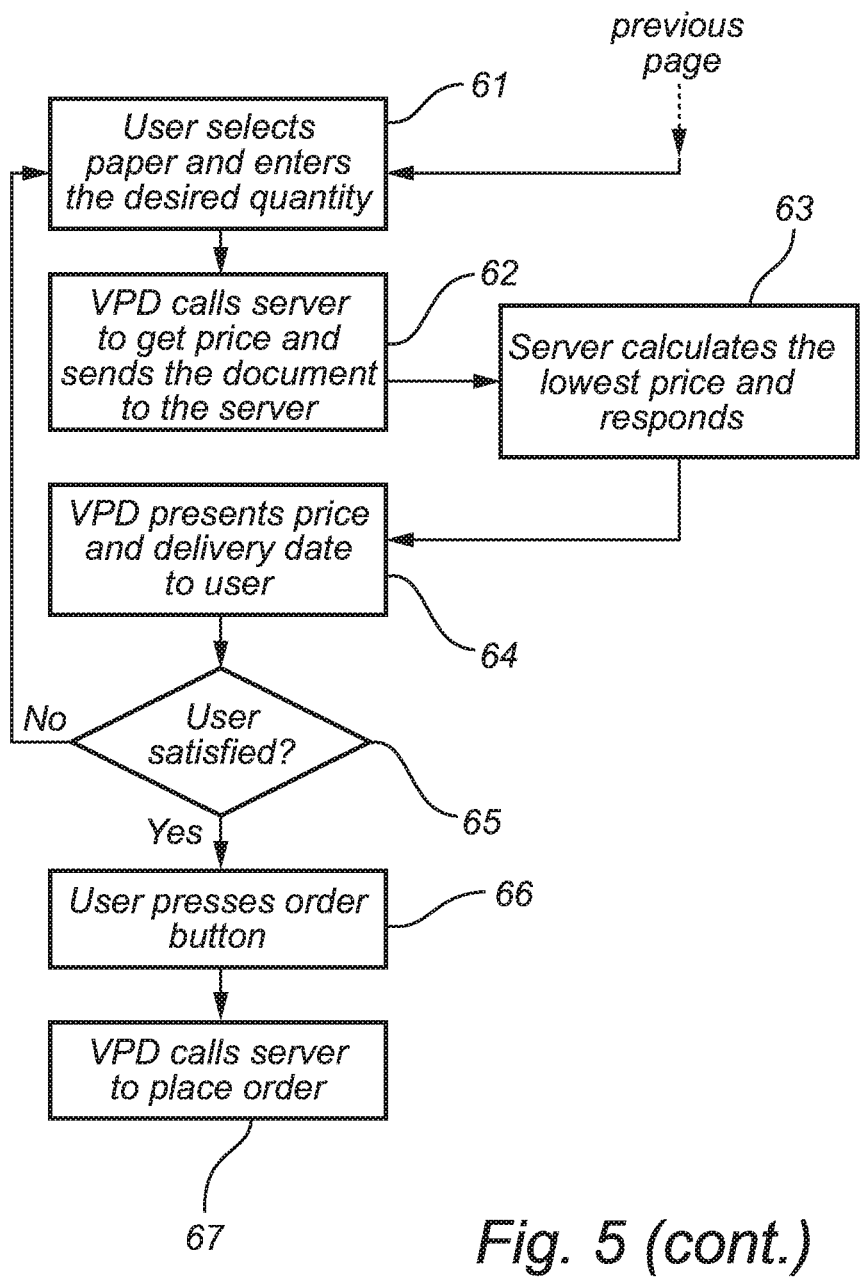

As an alternative to being integrated in the operating system, the virtual print driver is integrated in a website, such as e.g. Wordpress or Episerver. As a further alternative, the virtual print driver is integrated in a desktop application, such as e.g. Adobe InDesign or Microsoft Word. Referring to the flow chart of FIG. 5, as will be described below, the same operations are performed except for the initial operation, in box 50, where the plug-in is started in the way that is customary in the web site or desktop application.

On a more detailed level of description, the printing procedure comprises the following operations. The procedure is activated by the user selecting to print in any desktop application, in box 50. Among the possible alternatives of printers coming up on the screen the virtual printer driver appears. The user selects the virtual printer driver, in box 51, and the user's choice is detected by the printing procedure. Next, in box 52, the virtual printer driver opens the print job, i.e. the document to be printed, to extract document properties, which are useful to generate a printed matter specification. Such variables are, inter alia, size, colors, bleed, and number of pages.

Then, as a part of the printing procedure, a user authentication procedure can optionally be performed to authenticate the user before the optimization device. The authentication procedure comprises the following operations. First it is checked whether or not user credentials are stored locally, i.e. in the remote device 2, such as the user's computer, in box 53. If they are, a login call is sent to the server 4, in box 58, and the server 3 checks the login, in box 56. If there are no stored credentials, an account must be created. The user is requested to input his/her credentials, and, at reply from the user, the credentials are locally stored, in box 54. When the login is successful a session ID is received from the server 3, in box 57, when not a failure message is received from the server 3 and the processing is returned to box 54. At reception of the session ID, a request for paper stock lists is sent to the server 3, in box 59, and the paper stock list is then received from the server 3, in box 60, and presented to the user. A selection of paper and a desired quantity is received as user input, in box 61, and a corresponding printed matter specification is generated and sent to the server 3 with a price request, in box 62. The server 3 determines the lowest possible price, as described above, in box 63, and data about the price and about a delivery date is received from the server 3, and then presented to the user, in box 64.

If the user is satisfied, in box 65, the user presses an order button, i.e. corresponding input data is received, in box 66. As a result of that an order is sent together with the document to the server 3, in box 67. As described above, the server 3 then stores the order and the document, and transfers the order, the document, and a production specification to the printing provider.

The optimization unit 3 returning the production cost for specified printed matters can be used in a number of applications. Thus, according to the present invention, there is provided a method for calculating the production cost, wherein a web browser is used to present a user interface, where the user is prompted to specify one or several printed matters, the optimization unit 3, such as the server, is called, and the production cost is received from the server 3 and presented to the user via the user interface. Depending on the user account, the production alternatives including impositions and estimates can be presented, or the prices can be presented, i.e. cost and markup. Typically, this method is cloud-based.

According to the present invention there is provided a cloud-based system to create and save, for instance, quotes, orders, delivery notes and invoices.

According to the present invention, there is provided an open application programming interface (API), which is connected with an optimization unit (OU), as defined and described above, which is arranged to perform the method of automatically optimizing a print production process. The API is connected with an application program unit (APU) as well. The APU runs an application program, which the user uses. The API is arranged to perform a user authentication operation, provide paper data to a user, calculate a price of a printed matter, and order the production of a printed matter. This means that the API is useful for publishing the service to be used by other systems, provided they are using the right format and have an account. Thereby, other systems, like e-commerce platforms, CRM-systems, MIS/ERP and workflow systems, can be made more powerful using automatic print estimation.

Figure 6:
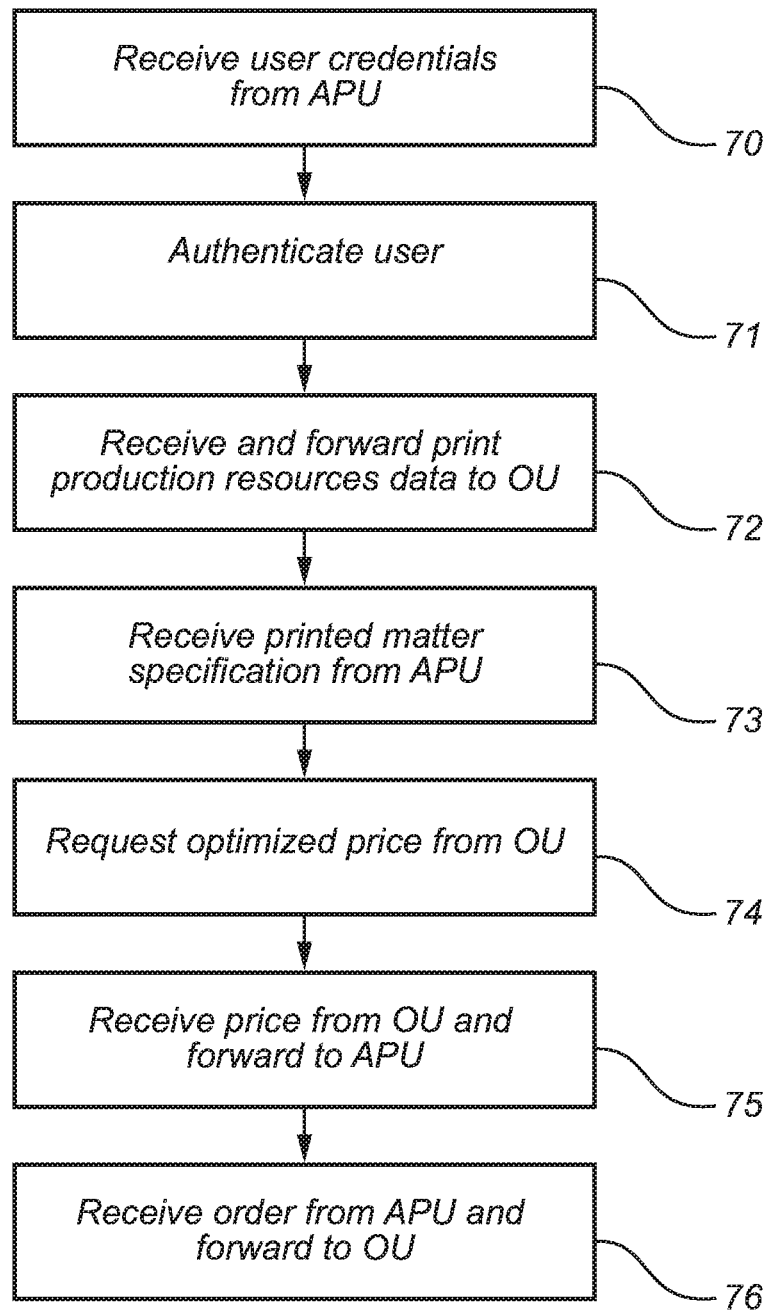
FIG. 6 is a flow chart of an embodiment of an API according to the present invention.
Figure 7:
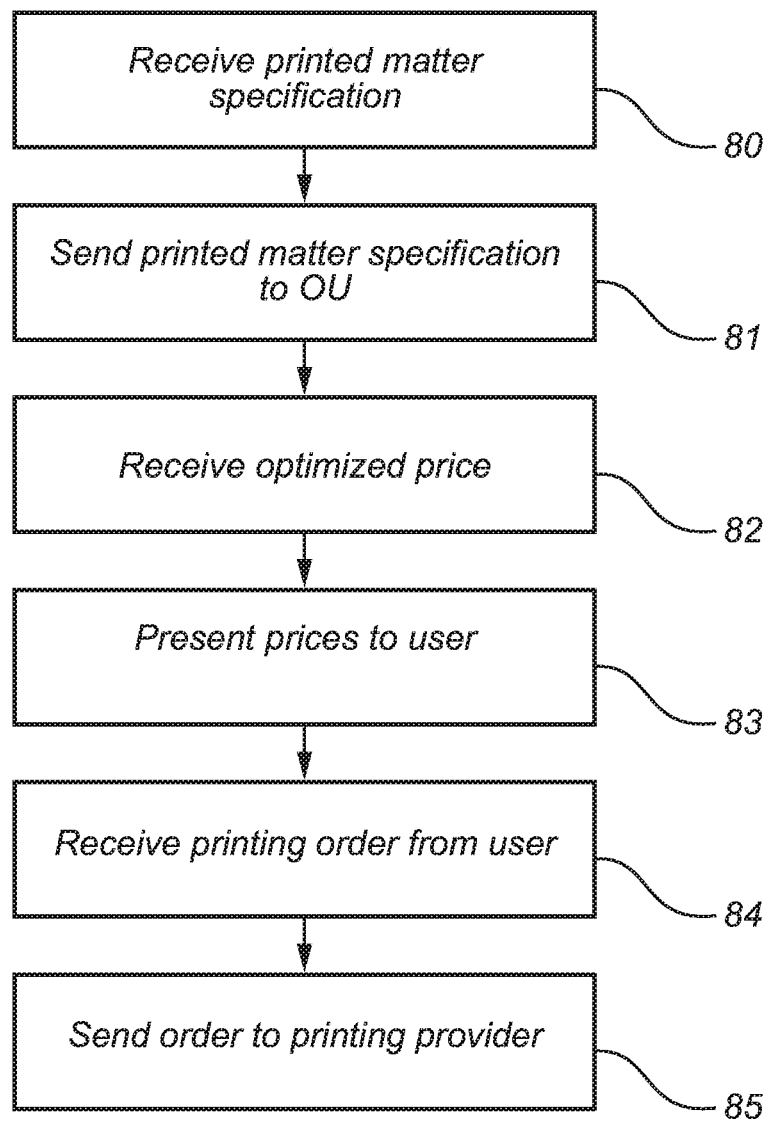
FIG. 7 is a flow chart of an embodiment of a method performed by a portal according to the present invention.

In other words, the API performs a method comprising the following operations, as illustrated in FIG. 6. First, user credentials are received from, i.e. via user input to, the application program, in box 70. Then a user authentication operation is performed, in box 71. Next print production resources data, at least including print paper data, are requested and received from the optimization unit, and the print paper data is forwarded to the application program unit, in box 72. A printed matter specification comprising at least one printed matter is received from the application program unit, box 73, and sent to the optimization unit with a request for an optimized price on the at least one printed matter, in box 74. An optimized price is received in return, and provided to the application program unit, in box 75. If the user orders the printed matter by input to the application program unit, this information is received by the API, which in turn sends the order to the optimization unit, in box 76.

According to the present invention, there is provided a portal for print quotes and orders. The portal collects and assembles prices from several printing providers and either present the lowest price or a list of all providers. The portal can be fully automatic, i.e. it can transfer print jobs directly from the print buyer, i.e. the customer/user, to the individual printer with the lowest cost or the printer of choice. More particularly, the portal can be regarded as a portal unit, which performs a portal method comprising the operations of:
  receiving input data comprising a printed matter specification, in box 80;
  sending, in box 81, the printed matter specification, and an associated request for optimized prices from several printing providers, to an optimization unit, as the optimization unit described above;
  receiving the optimized prices associated with several printing providers, in box 82;
  presenting at least a lowest price of said optimized price to the user, box 83;
  receiving a printing order from the user, in box 84; and
  sending the order to the printing provider, in box 85.

As an option, the printing provider associated with the price can be presented to the user as well. This presentation can be conditional, for instance depending on who is logged in.

As an alternative, the portal can be used internally at large groups of printing companies to distribute print jobs within the group. In this application, the optimization is done for several printing providers, and a best prize is determined for each printing provider. A list of prizes for the respective printing provider is provided to the user. The above-described printing procedure can be combined with this portal.

According to another application, there is provided an embodiment of the production optimization system that determines the most cost-effective production process for a set of printing requests, which comprises one or more requests, and exports the details to other systems like business systems, production systems (MIS/ERP), and pre-press workflow systems. More particularly, one or more orders for printed matter are received from one or more customers at an order receiving device comprised in the system. The order receiving device arranges all the orders in a printed matter specification, and sends the printed matter specification to an optimization unit, such as the server 3, of a system 1 for determining an optimized print production specification as described above. Seen from the optimization unit, the order receiving device is the remote device 2. A result of the optimization is received at the order receiving device from the optimization unit.

While the invention has been illustrated and described in detail in the drawings and foregoing description, such illustration and description are to be considered illustrative or exemplary and not restrictive; the invention is not limited to the disclosed embodiments.

For instance, it should be noted that for a modified embodiment where the method is executed by the user's computer and/or additional local devices, the remote device is to be interpreted generally to be a different local device than the one that executes the method, or different hardware or software module within the same physical device.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measured cannot be used to advantage. Any reference signs in the claims should not be construed as limiting the scope.

The invention claimed is:

1. A computer-implemented method of automatically optimizing a print production process, comprising the operations of:
  receiving a printed matter specification, comprising data regarding at least one printed matter, as input data from a remote device; and
  determining an optimized print production specification on basis of the printed matter specification and print production resources data;
  wherein the operation of determining an optimized print production specification comprises:
    fetching print production resources data, comprising printing press data regarding at least one available printing press, and data regarding available paper stock items and their pricing, wherein the printing press data includes specifications and pricing;

determining, for each printing press, matching paper stock items that can be used with the printing press, by means of said data regarding available paper stock items;

determining all possible signatures by means of the printed matter specification;

determining, for each printing press, all possible print sheet sizes and print areas, by means of the printing press data;

determining all possible impositions by means of at least the signatures and the print areas; and determining an optimized production specification by means of at least the impositions, the print areas, and at least one optimization variable comprising a cost variable.

2. The method according to claim 1, said determining an optimized production specification comprising storing each combination of signatures, printing press, print area and imposition as a print sheet alternative, and determining, for each stored print sheet alternative, a number of printing plates, a number of impressions, and a number of sheets to be printed.

3. The method according to claim 2, said determining a number of sheets to be printed comprising determining a net number of sheets to be printed by dividing a required quantity of the print sheet after printing of each signature with the number of ups of the signature, finding the largest number of these results, and then determining the gross number of sheets to be printed by adding an estimate for setup and run waste.

4. The method according to claim 2, said determining an optimized production specification comprising determining all production alternatives by determining all feasible combinations of print sheet alternatives to print all required signatures once, and determining said at least one optimization variable for all production alternatives.

5. The method according to claim 4, said determining an optimized production specification comprising determining a best choice among the results of the determination of said at least one optimization variable for all production alternatives; wherein the method further comprises sending at least data associated with the best choice to the remote device.

6. The method according to claim 1, said determining an optimized production specification comprising reducing the number of alternatives to compare by applying an exclusion criterion, which excludes unrealistic alternatives.

7. The method according to claim 1, further comprising sending a printing order including the optimized production specification to a printing provider having production resources which enable printing according to the optimized production specification.

8. The method according to claim 1, wherein the optimized production specification comprises at least a list of print sheets and associated data, a list of work tasks to be performed at a printing provider, and a list of all material needed to produce the printed matter according to the printed matter specification.

9. The method according to claim 1, wherein the group of optimization variables further comprises costs for expendible supplies, and a contribution margin.

10. The method according to claim 1, wherein the printed matter specification comprises type of printed matter, number of pages, finished size of the printed matter, paper stock type or brand, texture, color, weight, the number and type of printing colors, quantity, and finishing and other options.

11. A system for determining an optimized print production specification, comprising:
a database containing print production resources data; and
an optimization unit, which is adapted to perform the operations of:
receiving a printed matter specification, comprising data regarding at least one printed matter, as input data from a remote device; and
determining an optimized print production specification on basis of the printed matter specification and print production resources data, including:
fetching print production resources data, comprising printing press data regarding at least one available printing press, and data regarding available paper stock items and their pricing; the printing press data including specifications and pricing;
determining, for each printing press, matching paper stock items that can be used with the printing press, by means of said data regarding available paper stock items;
determining all possible signatures by means of the printed matter specification;
determining, for each printing press, all possible print sheet sizes and print areas, by means of the printing press data;
determining all possible impositions by means of at least the signatures and the print areas; and
determining an optimized production specification by means of at least the impositions, the print areas, and at least one optimization variable comprising a cost variable.

12. A printing procedure, which is arranged to be activated by a user who has created a document to be printed, comprising:
detecting a choice of the printing procedure for executing a print job;
scanning the print job for metadata;
requesting print production resources data from an optimisation device, which is adapted to perform the operations of:
receiving a printed matter specification, comprising data regarding at least one printed matter, as input data from a remote device; and
determining an optimized print production specification on basis of the printed matter specification and print production resources data, including:
fetching print production resources data, comprising printing press data regarding at least one available printing press, and data regarding available paper stock items and their pricing; the printing press data including specifications and pricing;
determining, for each printing press, matching paper stock items that can be used with the printing press, by means of said data regarding available paper stock items;
determining all possible signatures by means of the printed matter specification;
determining, for each printing press, all possible print sheet sizes and print areas, by means of the printing press data;
determining all possible impositions by means of at least the signatures and the print areas; and
determining an optimized production specification by means of at least the impositions, the print areas, and at least one optimization variable comprising a cost variable;
the printing procedure further comprising:

presenting print production data, included in the print production resources data, and comprising at least a paper stock list, to the user, and prompting the user to input printed matter variables comprising at least a choice of paper and an associated quantity;

receiving the printed matter variables, generating a printed matter specification and sending the printed matter specification to the optimization device;

receiving at least data associated with a best choice from the optimization device and presenting it to the user; and checking for user input of an acceptance, and, when receiving an acceptance, requesting the optimization device to send a printing order including the optimized production specification and the document to be printed to a printing provider having production resources which enable printing according to the optimized production specification.

13. The printing procedure according to claim 12, comprising a user authentication procedure versus the optimization device.

14. The method according to claim 2, said determining an optimized production specification comprising reducing the number of alternatives to compare by applying an exclusion criterion, which excludes unrealistic alternatives.

15. The method according to claim 2, further comprising sending a printing order including the optimized production specification to a printing provider having production resources which enable printing according to the optimized production specification.

16. The method according to claim 3, further comprising sending a printing order including the optimized production specification to a printing provider having production resources which enable printing according to the optimized production specification.

17. The method according to claim 4, further comprising sending a printing order including the optimized production specification to a printing provider having production resources which enable printing according to the optimized production specification.

18. The method according to claim 2, wherein the optimized production specification comprises at least a list of print sheets and associated data, a list of work tasks to be performed at a printing provider, and a list of all material needed to produce the printed matter according to the printed matter specification.

19. The method according to claim 3, wherein the optimized production specification comprises at least a list of print sheets and associated data, a list of work tasks to be performed at a printing provider, and a list of all material needed to produce the printed matter according to the printed matter specification.

* * * * *